United States Patent [19]
Perreault et al.

[11] Patent Number: 5,809,427
[45] Date of Patent: Sep. 15, 1998

[54] APPARATUS AND METHOD FOR CHANNEL ACQUISITION IN A COMMUNICATION SYSTEM

[75] Inventors: John A. Perreault, Hopkinton; John Dinatale, Pembroke; Mark C. Miner, Foxboro, all of Mass.

[73] Assignee: Motorola Inc., Schaumburg, Ill.

[21] Appl. No.: 681,770

[22] Filed: Jul. 29, 1996

Related U.S. Application Data

[63] Continuation-in-part of Ser. No. 623,068, Mar. 28, 1996.
[51] Int. Cl.$^6$ .............................. H04B 7/00; H04Q 7/20
[52] U.S. Cl. .......................... 455/513; 455/450; 455/62
[58] Field of Search .............................. 455/9, 32.1, 34.1, 455/34.2, 53.1, 56, 62, 64.1, 65, 450, 451, 452, 517, 67.1, 513, 509

[56] References Cited

U.S. PATENT DOCUMENTS

| | | | |
|---|---|---|---|
| 4,894,856 | 1/1990 | Nakanishi et al. | 455/34.2 |
| 5,050,234 | 9/1991 | Ohteru | 455/34.1 |
| 5,077,830 | 12/1991 | Mallia | 455/58 |
| 5,133,080 | 7/1992 | Borras | 455/34.1 |
| 5,408,682 | 4/1995 | Ranner et al. | 455/34.2 |
| 5,487,069 | 1/1996 | O'Sullivan et al. | 455/65 |
| 5,507,008 | 4/1996 | Kanai et al. | 455/34.1 |
| 5,551,064 | 8/1996 | Nobbe et al. | 455/34.1 |
| 5,642,400 | 6/1997 | Arai et al. | 455/34.2 |

*Primary Examiner*—Reinhard J. Eisenzopf
*Assistant Examiner*—Sam Bhattacharya
*Attorney, Agent, or Firm*—Nancy R. Gamburd; Jeffrey T. Klayman

[57] ABSTRACT

An apparatus (101, 110) and method for channel acquisition in a communication system (100) provides for selecting a channel, from a multiplicity of available channels (205), and determining whether the selected channel is the properly assigned channel for data and other information to be received by the apparatus (101, 110). The selected channel is monitored for a predetermined or adaptive energy level (210), a predetermined modulation mode (215), for a protocol signal, and for a protocol signal having an identification specifying the particular apparatus (225), such as a protocol frame containing a serial number corresponding to the apparatus. When a protocol signal having an identification specifying the particular apparatus (225) is received, the selected channel is acquired (250) for reception of data and other information. Channels are selected on the basis of searching first for those channels most likely to be assigned to the particular apparatus, such as previously assigned channels (305, 320, 325), followed by a focused search initially in the vicinity of a central channel under a particular channel plan (345, 355). The process may also be repeated utilizing a variety of channel or frequency plans (375).

48 Claims, 5 Drawing Sheets

APPARATUS AND METHOD FOR CHANNEL ACQUISITION IN A COMMUNICATION SYSTEM

CROSS-REFERENCE TO RELATED APPLICATION

This application is a continuation in part of Perreault et al. U.S. patent application Ser. No. 08/623,068, entitled "Apparatus And Method For Channel Acquisition in a Communication System", filed Mar. 28, 1996, with priority claimed for all commonly disclosed subject matter.

FIELD OF THE INVENTION

This invention relates, in general, to data communication and data communication systems and devices and, more specifically, to an apparatus and method for channel acquisition in a communication system.

BACKGROUND OF THE INVENTION

With the advent of multimedia communications, data transmission has become increasingly complex. For example, multimedia communication applications such as real time transmission of digitally encoded video, voice, and other forms of data, may require new forms and systems for data communication and data transmission. One such new communication system is the CableComm™ System currently being developed by Motorola, Inc. In the CableComm™ System, a hybrid optical fiber and coaxial cable is utilized to provide substantial bandwidth over existing cable lines to secondary stations such as individual, subscriber access units, for example, in households having new or preexisting cable television capability. These coaxial cables are further connected to fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber service. With the CableComm™ System, digital data may be transmitted both in the downstream direction, from the primary station or controller (connected to a network) to the secondary station of an individual user (subscriber access unit), and in the upstream direction, from the secondary station to the primary station (and to a network).

In the CableComm™ System, downstream data is currently intended to be transmitted using 64 quadrature amplitude modulation ("QAM") at a rate of 30 M bps (megabits per second), over channels having 6 MHz bandwidth in the frequency spectrum of 50–750 MHz, and potentially up to 1 GHz. Anticipating asymmetrical requirements with large amounts of data tending to be transmitted in the downstream direction rather than the upstream direction, less capacity is provided for upstream data transmission, using $\pi/4$ differential quadrature phase shift keying ($\pi/4$-DQPSK) modulation in the frequency band from 5–42 MHz with a symbol rate of 384 k symbols/sec with 2 bits/symbol. In addition, the communication system is designed to have a multipoint configuration, i.e., many secondary stations (also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. In addition, it is also highly likely that transmission may be bursty, with various users receiving or transmitting data at indeterminate intervals over selected channels in response to polling, contention, or other protocols from the primary station, rather than transmitting a more continuous and synchronous stream of information over a dedicated or circuit switched connection.

As secondary stations are powered up, enter the communication (or communications) system or network, or otherwise come on line in such a communication system, in a communication system having many channels, each secondary station should know what channel upon which it may receive information transmitted from the primary station. Indeed, each secondary station should have such information prior to any communication of information from the primary station, because if the secondary station does not know what channel it should be listening on or tuned to, the secondary station may miss information directed to it from the primary station. A corresponding paradox may arise, however, because the secondary station may not know what channel to listen on or tune to without receiving information from the primary station.

Prior art approaches to this problem have generally provided for a predetermined, fixed channel designated for initial start up, such as a hardware or software encoded channel selection. Other prior art approaches have required user intervention, for example, direct configuration of the device by the user during the start up operation for data reception. Utilization of a fixed or predetermined channel, however, does not provide for system flexibility, particularly under variable conditions, such as a high volume of traffic or high noise conditions, when the designated channel may be unusable or impaired. Direct user intervention may not be feasible, as the user must also have access to information concerning what the designated channel will be, or will also configure the system for a fixed or predetermined channel. As a consequence, a need remains in such a communication system, having multiple channels, for an apparatus and method to quickly and reliably detect a channel designated or allocated for reception of information, without user intervention, while simultaneously providing maximal flexibility and agility in the usage of the available channels.

DETAILED DESCRIPTION OF THE INVENTION

As mentioned above, a need has remained for an apparatus and method to provide for quick and reliable detection of a channel designated for reception of data and other information, without utilizing a predetermined or fixed channel, without user intervention, and without actual prior knowledge of the designated channel. The apparatus and method in accordance with the present invention provides such quick and reliable channel detection, without utilization of fixed channels or user intervention. As a consequence, the apparatus and method of the present invention enables increased communication system agility and flexibility in channel utilization, particularly under conditions of high traffic or high noise conditions, when utilization of additional or other channels may be preferred.

Figure 1:
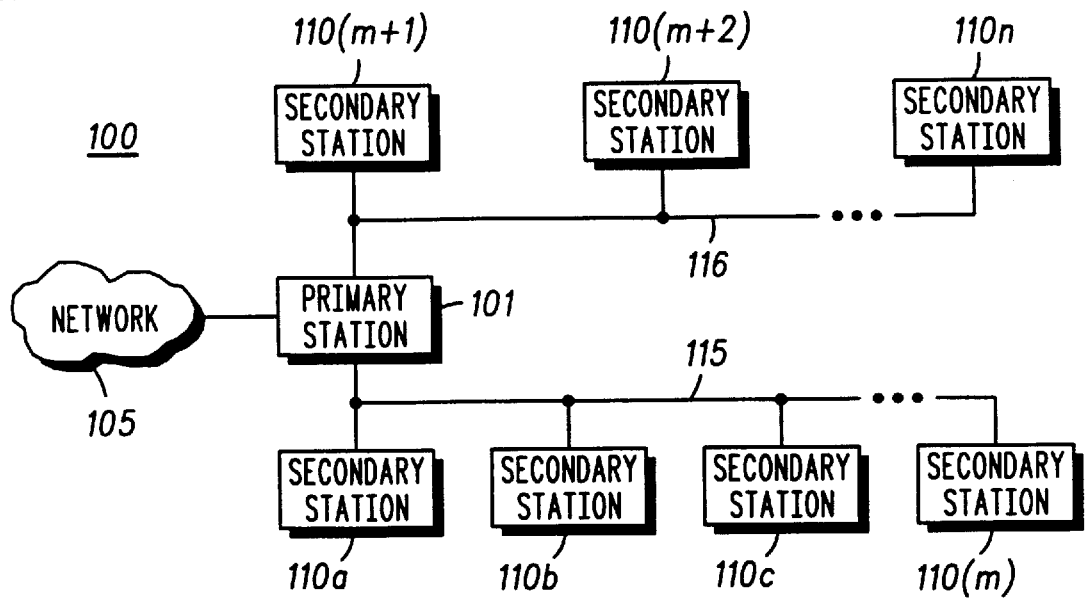
FIG. 1 is a block diagram illustrating a communication system in accordance with the present invention.

FIG. 1 is a block diagram illustrating a communication system 100 in accordance with the present invention. As illustrated in FIG. 1, a primary station 101, also referred to as a primary device or primary transceiver unit, is coupled to a plurality of secondary stations $110_a$ through $110_n$, via communications media 115 and 116. In the preferred embodiment, communications media 115 and 116 are hybrid optical fiber and coaxial cable. In other embodiments, the communication media may be coaxial cable, fiber optic cable, twisted pair wires, and so on, and may also include air, atmosphere or space for wireless and satellite communication. The primary station 101 is also coupled to a network 105, which may include networks such as the Internet, on line services, telephone and cable networks, and other communication systems. The secondary stations $110_a$ through $110_n$ are illustrated in FIG. 1 as connected to the primary station 101 on two segments or branches of a communications medium, such as communications media 115 and 116. Equivalently, the secondary stations $110^a$ through $110_n$ may be connected to more than one primary station, and may be connected to a primary station (such as primary station 101) utilizing more or fewer branches, segments or sections of any communication medium.

Continuing to refer to FIG. 1, in the preferred embodiment, the communications medium, such as communications media 115 and 116, has or supports a plurality of channels (equivalently referred to as communications channels). For ease of reference, the communications channels in which a primary station, such as the primary station 101, transmits information, signals, or other data to a secondary station, such as secondary station $110^n$, are referred to as downstream channels or downstream communication channels. Also for ease of reference, the communications channels in which a secondary station, such as secondary station $110_n$, transmits information, signals, or other data to a primary station, such as primary station 101, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. As mentioned above, in the preferred embodiment of the CableComm™ System, the communications medium is hybrid fiber coaxial cable, with downstream channels in the frequency spectrum (band) of 50–750 MHz, and with upstream channels in the frequency spectrum of 5–42 MHz.

Figure 2:
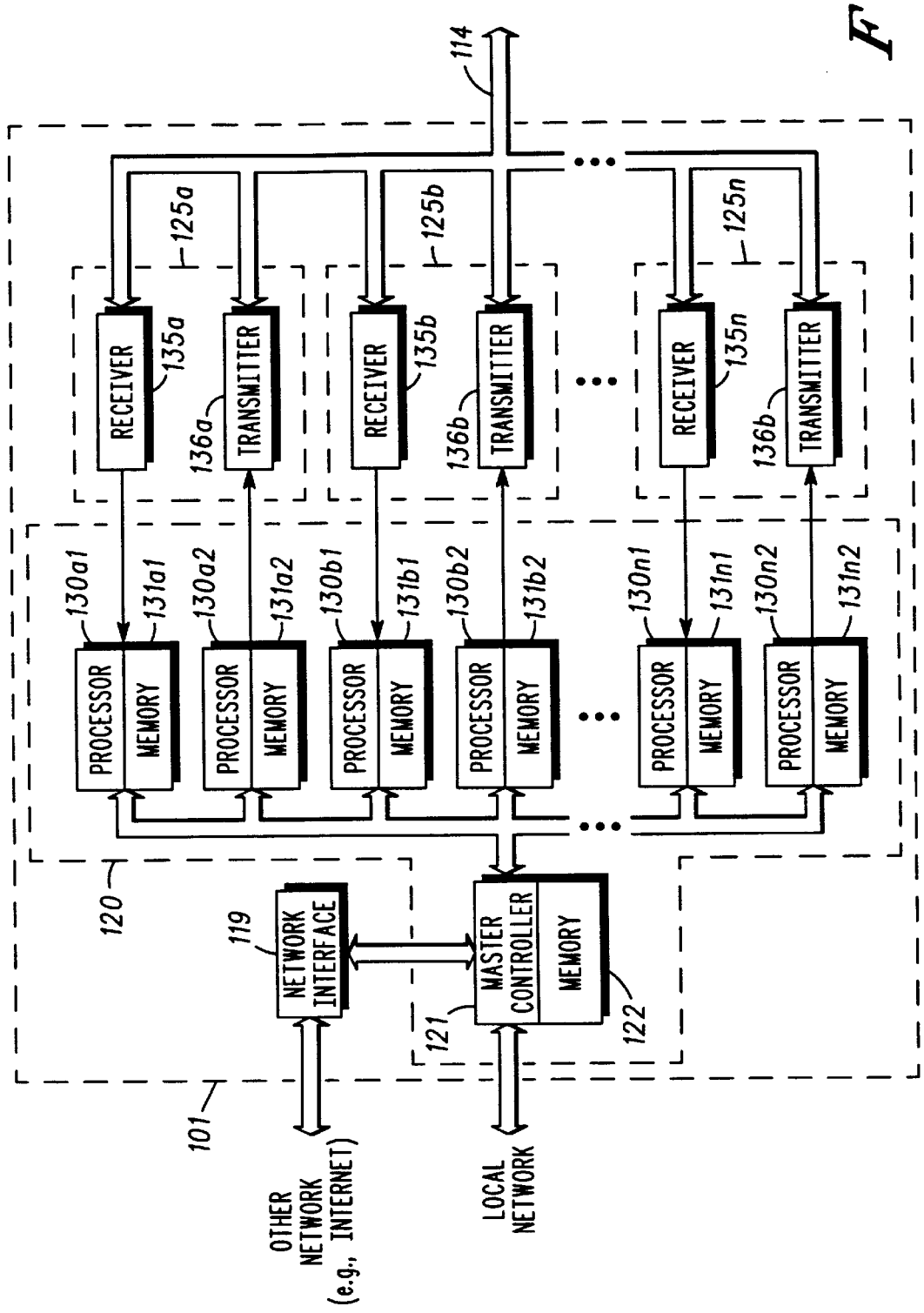
FIG. 2 is a block diagram illustrating a primary station apparatus in accordance with the present invention.

FIG. 2 is a block diagram illustrating a primary station 101 in accordance with the present invention. The primary station 101 is coupled to a communication medium 114 for upstream and downstream communication to one or more secondary stations (not illustrated), and is coupleable to a network, such as the Internet, through a network interface 119. The primary station includes a processor arrangement 120 which is connected to a plurality of channel interfaces, channel interface $125_a$ through channel interface $125_n$, for communication over the communication medium 114. The processor arrangement 120 includes a master controller 121 having or connected to memory 122, and one or more additional processors $130_{a1}$ through $130_{n2}$ and corresponding associated memories $131_{a1}$ through $131_{n2}$. In the preferred embodiment, the master controller 121 is a Motorola M68040 processor, and the memory 122 is 16 MB RAM. The master controller 121 performs a variety of higher level functions in the preferred embodiment, such as spectrum management, routing functions, management of secondary stations, and communication protocol management (such as SNMP management). The master controller 121 is connected to a plurality of other processors, collectively referred to as processors 130 and separately illustrated as processor $130_{a1}$, processor $130_{a2}$, through processor $130_{n1}$ and processor $130_{n2}$. Each of these processors, processor $130_{a1}$, processor $130_{a2}$, through processor $130_{n1}$ and processor $130_{n2}$, is also coupled to or contains corresponding memory circuits, memory $131_{a1}$, memory $131_{a2}$, through memory $131_{n1}$ and memory $131_{n2}$. In the preferred embodiment, each of these processors 130 are also Motorola M68040 processors, while the corresponding memory circuits, memory $131_{a1}$ through memory $131_{n2}$, are 4 MB RAM. In the preferred embodiment, the processors 130 perform such functions related to upstream and downstream data protocols, such as sending downstream a poll message, an acknowledgment message, or as pertaining to the present invention, transmitting a message downstream which contains a listing of identifications of secondary stations, as discussed in greater detail below with reference to FIGS. 4 and 5. Should the apparatus and method of the present invention be utilized in the primary station 101, for some type of upstream channel acquisition, the apparatus and method would be embodied within the processor arrangement 120, as a set of program instructions, in a manner equivalent to its incorporation in the various secondary stations discussed below.

Continuing to refer to FIG. 2, each of these processors $130_{a1}$ through $130_{n2}$ of the processor arrangement 120 are connected to corresponding receivers and transmitters of the channel interfaces, channel interface $125_a$ through channel interface $125_n$ (collectively referred to as channel interfaces 125), namely, receiver $135_a$ through receiver $135_n$ (collectively referred to as receivers 135) and transmitter $136_a$ through transmitter $136_n$ (collectively referred to as transmitters 136). In the preferred embodiment, depending upon the functions implemented, each of the receivers $135_a$ through $135_n$ may include a Motorola M68302 processor, a Motorola 56000 series digital signal processor, a ZIF SYN integrated circuit, and an LSI Logic L64714 (Reed-Solomon decoder), for demodulation and for decoding forward error correction and cyclic redundancy checks. In the preferred embodiment, also depending upon the functions implemented, each of the transmitters $136_a$ through $136_n$ may include a Motorola M68302 processor, a Motorola 56000 series digital signal processor, a ZIF SYN integrated circuit, and an LSI Logic L64711 (Reed-Solomon encoder), for modulation and for coding for forward error correction and cyclic redundancy checks. As a consequence, as used herein, the channel interfaces 125 may be considered to perform the functions of data and other signal reception and transmission, regardless of the specific hardware implementations and additional functions which may or may not be implemented. The various memories illustrated, such as memory 122 or $131_{a1}$, may also be embodied or contained within their corresponding processors, such as master controller 121 or processor $130_{a1}$. In addition, the various memories illustrated, such as memory 122 or $131_{a1}$, similarly to memory 155 discussed with reference to FIG. 3, may also contain different types of memory, implemented in commercially available integrated circuits, such as random access memory, non-volatile memory, and flash-type memory.

Figure 3:
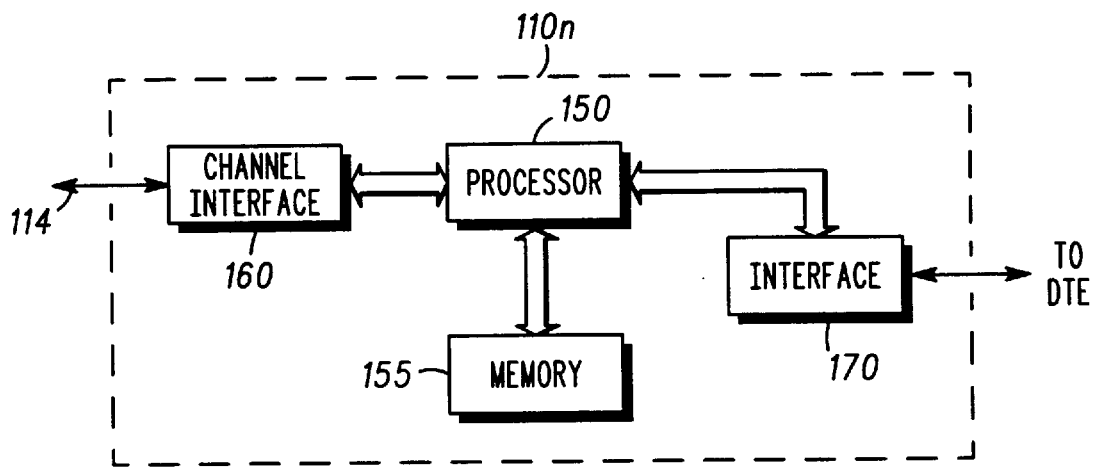
FIG. 3 is a block diagram illustrating a secondary station apparatus in accordance with the present invention.

FIG. 3 is a block diagram illustrating a representative secondary station, such as secondary station $110_n$, in accordance with the present invention. The secondary station $110_n$ includes a processor (or processor arrangement) 150, with the processor 150 having or coupled to a memory 155. In the preferred embodiment, the processor 150 is a Motorola M68302 processor (also known as an integrated multiprotocol processor), and the memory 155 is 256 K RAM. The processor 150 is coupled to an interface 170, such as an ethernet port or an RS232 interface, for connection to a computer, a workstation, or other data terminal equipment ("DTE"). The processor 150 is also coupled to a channel interface 160 for communication over the communication medium 114. The channel interface 160, in the preferred embodiment, depending upon the functions implemented, includes a Motorola M68HC11 integrated circuit, a ZIF SYN integrated circuit, a Broadcom BCM3100 QAMLink integrated circuit, a Motorola TxMod integrated circuit, and LSI Logic L64711 and L64714 integrated circuits, and performs such functions as forward error correction encoding and decoding, QAM demodulation (for downstream reception), DQPSK modulation (for upstream transmission), transmit level and frequency adjustment, for data and other signal reception and transmission. As a consequence, as used herein, the channel interface 160 may be considered to perform the functions of data and other signal reception and transmission, regardless of the specific hardware implementations and additional functions which may or may not be implemented. The memory illustrated as memory 155 may also be embodied or contained within the corresponding processor 150. In the preferred embodiment, the memory 155 includes, as separate integrated circuits ("ICs"), three types of memory, namely, random access memory, non-volatile memory, and flash memory, which may be implemented utilizing known, commercially available ICs. Also in the preferred embodiment, the processor (or processor arrangement) 150 performs the functions of channel acquisition, for acquiring a downstream channel, in accordance with the present invention, as described in greater detail below. As channels are acquired or as a secondary station is reassigned to various channels, a listing or other record of these previous channels is stored in the non-volatile portion of the memory 155, also as described in greater detail below.

In the preferred apparatus embodiment illustrated in FIG. 3, the channel acquisition method discussed below with reference to FIGS. 4 and 5 may be programmed and stored, as a set of program instructions for subsequent execution, in the processor 150 and memory 155 of a secondary station 110, such as secondary station $110_n$ illustrated in FIG. 3. Information concerning channels a secondary station $110_n$ has been previously assigned, or default channel values on initial system start up, are stored in memory 155. To the extent that any upstream channel acquisition capability is necessary or desirable, the channel acquisition method may be programmed and stored, also as a set of program instructions for subsequent execution, in the primary station 101 illustrated in FIG. 2 and, more particularly, in each of the processors 130 (with their associated memories 131), utilizing π/4-DQPSK decoding performed by the corresponding receivers 135 (instead of QAM decoding).

In the preferred embodiment, as the secondary stations (collectively referred to as secondary stations 110) are powered up or otherwise come on line in the communication system 100, each secondary station $110_n$ needs to determine to which downstream channel (of the plurality of downstream channels) it is currently assigned in order to receive information or other data via the primary station 101. To facilitate such channel acquisition, in the preferred embodiment, the primary station 101 will periodically transmit or signal, as a broadcast to all secondary stations assigned to a particular channel, a poll or other message containing a listing or equivalent specification, by serial number or other means of identification, of each secondary station assigned to that particular channel. If more than one such message is necessary, for example, given limitations on the size of data packets which may be transmitted and depending upon the number of secondary stations assigned to the channel, the broadcast messages may also include an ordinal numbering or identification, such as 1 of n, 2 of n, and so on, through n of n, such that a secondary station will be able to determine when it has received all n of the n messages containing identifications of the secondary stations assigned to that channel. If a secondary station detects a broadcast message containing its identifier, such as a serial number identification, then the secondary station has determined that it is assigned to that particular channel. If a secondary station has received all broadcast messages but has not detected a broadcast message containing its identifier, the secondary station has thereby determined that it is not assigned to that particular channel, should select another channel and search for its identifier on this other channel, and should repeat the process of channel selection and searching until it has found its assigned channel. The apparatus and method of the invention provide for rapid and accurate channel acquisition, enabling a secondary station to immediately search channels to which it has a higher likelihood of being assigned, and to quickly eliminate other channels to which secondary stations have not been assigned. In addition, while the preferred embodiment utilizes signaling in a link layer through specific poll or broadcast messages, such signaling may be performed at any layer in a communication protocol, including the physical layer, the network layer, or in a software download (from a primary station 101 to a secondary station $110_n$).

Figure 4:
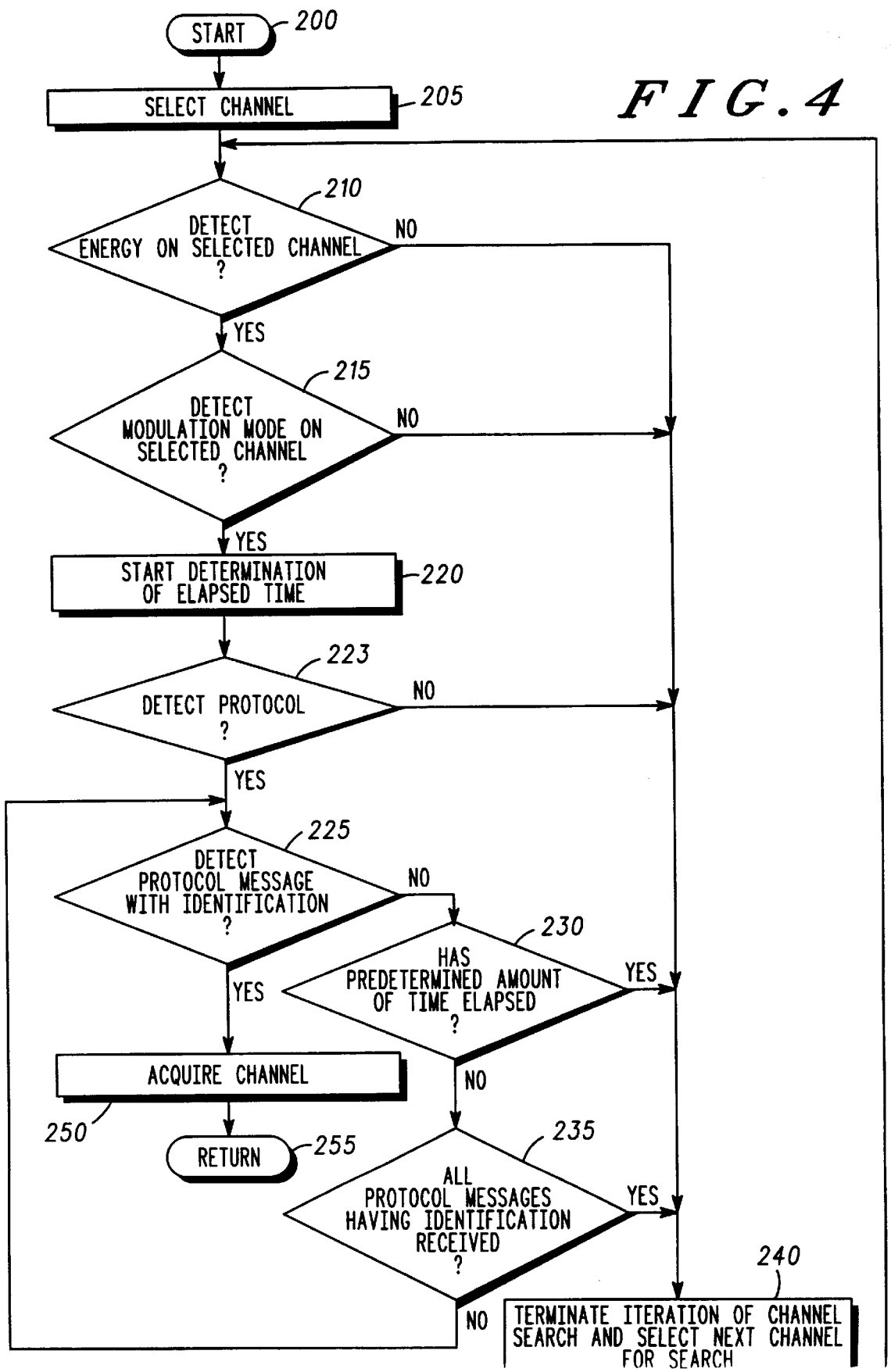
FIG. 4 is a flow chart illustrating the channel detection (search) portion of the method of channel acquisition in accordance with the present invention.

FIG. 4 is a flow chart illustrating the channel detection or channel search portion of the method of channel acquisition in accordance with the present invention. Beginning with start step 200, a channel is selected to commence the channel acquisition process, step 205. The channel selection process is discussed in greater detail below with reference to FIG. 5. In the preferred embodiment, a secondary station initially selects a previous channel it has been assigned to or, on initial system start up, a default channel. The selected channel is initially examined, in step 210, to determine whether the channel has a predetermined (or adaptive) level or threshold of energy, such that channels which do not have an expected or anticipated energy level or energy profile may be quickly eliminated from consideration as a possible assigned channel. Adaptive thresholds or levels of energy may be utilized to avoid searching idle but noisy channels, and to avoid other potential detection failures due to changing conditions and variations, such as indoor losses and gain variations. If the channel does not have a predetermined level of energy, that channel is eliminated from consideration as a possible assigned channel and the iteration of the channel detection or search process terminates, such that another channel may be selected in step 240, followed by another iteration of the channel search or detection process. If the channel does have a predetermined level of energy, then in step 215, the channel is examined or monitored to determine whether it has a particular or predetermined modulation mode, such as 64 QAM for downstream channels, or other modulation modes corresponding to the particular application. For example, a search for a 64 QAM mode may quickly eliminate television channels from consideration, because while energy may be detected on television channels, television channels do not currently utilize 64 QAM. Other modulation modes to be detected may include, for example, 128 QAM or 256 QAM. Again, if a predetermined modulation mode is not detected on the channel, that channel is eliminated from consideration as a possible assigned channel and the iteration of the channel detection or search process terminates, such that another channel may be selected in step 240, followed by another iteration of the channel search or detection process. If a predetermined modulation mode is detected on the channel, then that channel is monitored for a protocol message or other protocol layer signaling having a selected identification or identifier, such as a serial number of the particular or selected secondary station, step 225. As discussed below, prior to or as part of step 225, an additional step 223 may be included, namely, monitoring the channel for the selected protocol. If the selected channel does not have the selected protocol, then that channel is eliminated from consideration in step 223, and if the selected channel does have the selected protocol, then the selected channel is further monitored in step 225 for a protocol signal (or message) having a selected identification. If a protocol message having a selected identification has been detected in step 225, then the selected channel is known to be the assigned channel and, accordingly, the channel is acquired, step 250, and the channel acquisition process ends, return step 255.

Continuing to refer to FIG. 4, in the preferred embodiment, the process occurring in step 225 is limited to a predetermined period of time of approximately one minute, with a determination of elapsed time beginning in step 220. If a protocol message having a selected identification has not been detected in step 225 and a predetermined period of time has elapsed in step 230, that channel is eliminated from consideration as a possible assigned channel and the iteration of the channel detection or search process terminates, again followed by selection of another channel, and so on, in step 240. In the preferred embodiment, protocol messages having identification listings are transmitted on a regular, periodic basis. As a consequence, a secondary station will be able to determine the amount of time during which it should have received all protocol messages having identification listings; in the preferred embodiment, to expedite the search process, if that period of time has elapsed without a channel acquisition, that channel is eliminated from consideration. If a protocol message having a selected identification has not been detected in step 225, but a predetermined period of time has not elapsed in step 230, the method determines in step 235 whether all protocol messages having identification listings have been received, such as whether n of n protocol messages have been received. If all protocol messages having identification listings have not been received in step 235, the process returns to step 225 to continue to monitor for protocol messages containing identification listings, to determine whether another protocol message will be received which may contain the selected identification and, therefore, the current selected channel being currently searched would be the correct, assigned channel. If all protocol messages having identification listings have been received in step 235 (and given that a protocol message containing the selected identification has not been received in step 225), the channel currently being searched is not the assigned channel and, as a consequence, is eliminated from consideration. The method then proceeds to terminate the current iteration of the channel search and select another (or next) channel, step 240, for examination in another iteration of the channel search or detection process, returning to step 210.

As another variation, in the preferred embodiment, the determination of the protocol message may include two parts, illustrated in FIG. 4 as steps 223 and 225. In the first part, as step 223, the method simply detects whether or not the protocol is being utilized on the selected channel, without regard to the content of any protocol signaling or other messages. If the protocol is not in use on the selected channel, preferably within a predetermined period of time of three seconds, that channel is eliminated from consideration as a possible assigned channel. As another variation of step 223, downstream periodic framing may be detected as part of or in lieu of protocol detection. If the protocol is in use on the selected channel, then in the second part, step 225, the method further determines whether there is a protocol message or signal containing the selected identification, within a predetermined period of time of one minute. As a consequence, channels which may have both energy and the appropriate modulation mode, but not the proper protocol, are quickly eliminated from consideration (within 3 seconds), without waiting for the longer predetermined period of time (e, one minute) to elapse.

Other variations of the channel search methodology illustrated in FIG. 4 may also be utilized. For example, in the preferred embodiment, QAM detection is utilized in the detection of a modulation mode step 215. Other variations of modulation mode detection may include detection of spectral characteristics of non-video channels compared to video channels; detection of timing lock (sample timing recovery acquisition) compared to no timing lock; and detection of carrier lock (carrier frequency recovery acquisition) compared to no carrier lock. In addition, steps 223 and 225 may have additional variations for protocol detection, such as detection of HDLC flags, detection of valid HDLC frames having valid CRCs, and detection of synchronization of a FEC decoder.

Recognition of protocol messages having a selected identification (steps 223 and 225 of FIG. 4), and recognition of modulation mode (step 215 of FIG. 4), may also include making such determinations with configuration for different modulation modes, and with and without configuration for forward error correction ("FEC"), and for combinations of types of modulation mode and FEC. In addition, when FEC is utilized, configuration may be for different types of forward error correction, including variations in forward error correction based upon block size, interleaver depth, and other FEC parameters. In the preferred embodiment, FEC may or may not be utilized in downstream messages by a primary station 101 and, accordingly, a secondary station 110$_n$ would correspondingly configure or not configure for FEC for proper detection of downstream messages. As a consequence, a secondary station 110$_n$ may be able to receive downstream communications from more than one service provider (via a primary station 101) utilizing different modulation modes and different type of FEC (or potentially no FEC). In addition, a primary station 101 may also transmit various messages to a secondary station 110$_n$, including configuration messages indicating the type of FEC to be employed; as a consequence, a secondary station 110$_n$ may also perform such message detection utilizing various combinations of modulation modes, with and without FEC, and with different types of FEC, in order to determine whether and what type of modulation mode and/or FEC to employ subsequently.

In summary, FIG. 4 illustrates a method for channel acquisition in a communication system, the communication system having a communications medium, with the communications medium having a plurality of channels. The channel acquisition method then comprises:

(a) selecting a first channel of the plurality of channels to form a selected channel (step 205);

(b) commencing a channel search process by monitoring the selected channel for an energy level (step 210);

(c) when the selected channel does not have the energy level, proceeding to step (i) (steps 210 and 240);

(d) when the selected channel has the energy level, monitoring the selected channel for a predetermined modulation mode (steps 210 and 215);

(e) when the selected channel does not have the predetermined modulation mode, proceeding to step (i) (steps 215 and 240);

(f) when the selected channel has the predetermined modulation mode, monitoring the selected channel for a protocol message having a selected identification of a plurality of identifications (steps 215 and 225);

(g) when the selected channel does not have the protocol message having the selected identification, proceeding to step (i) (steps 225 and 240);

(h) when the selected channel has the protocol message having the selected identification, acquiring the selected channel to form an acquired channel and to terminate the channel search process (steps 225, 250 and 255); and (i) when the channel search process has not been terminated in step (h), selecting a second channel to form the selected channel and returning to step (b) (step 240).

Figure 5A:
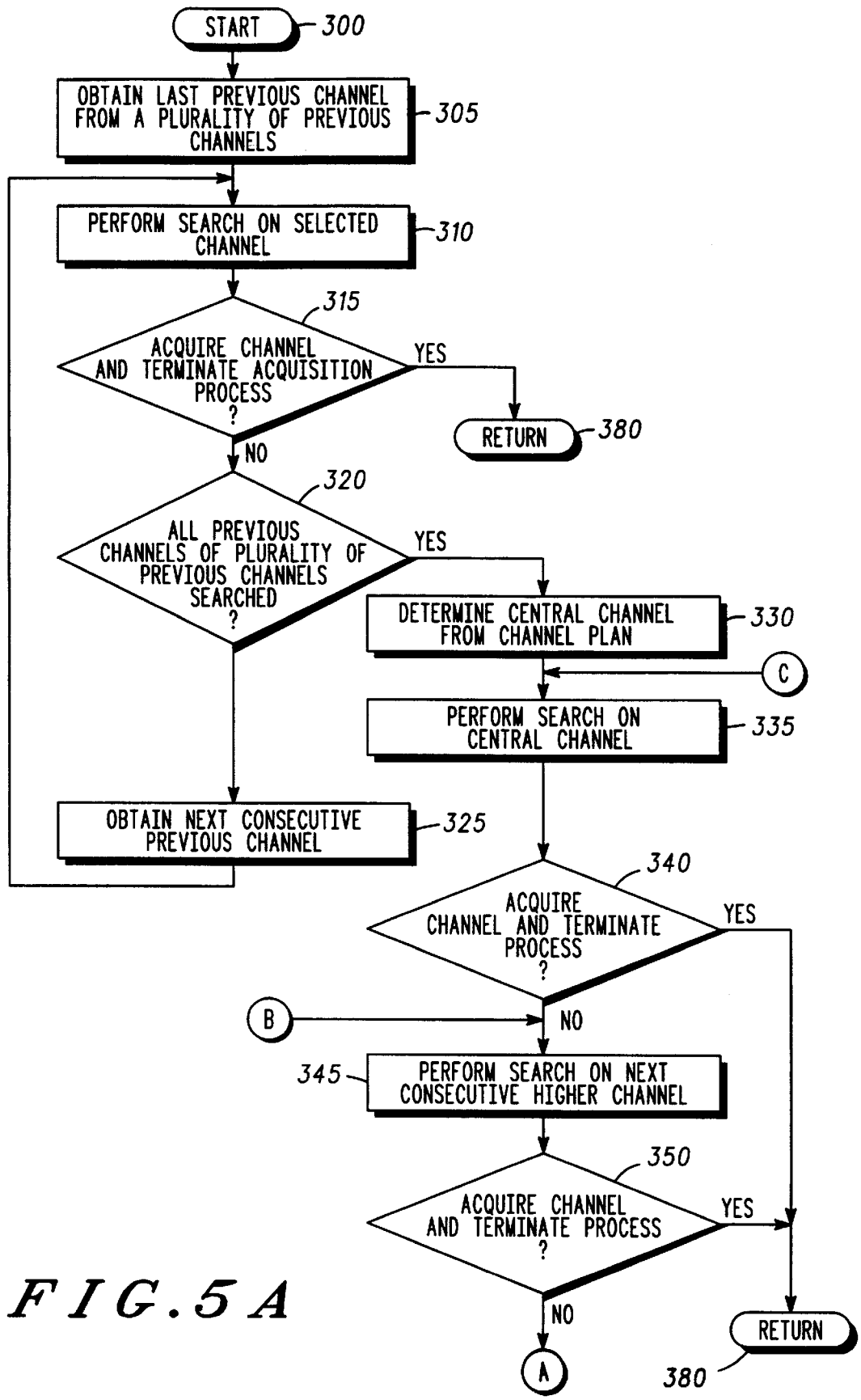
FIG. 5 is a flow chart illustrating the channel selection portion of the method of channel acquisition in accordance with the present invention.
Figure 5B:
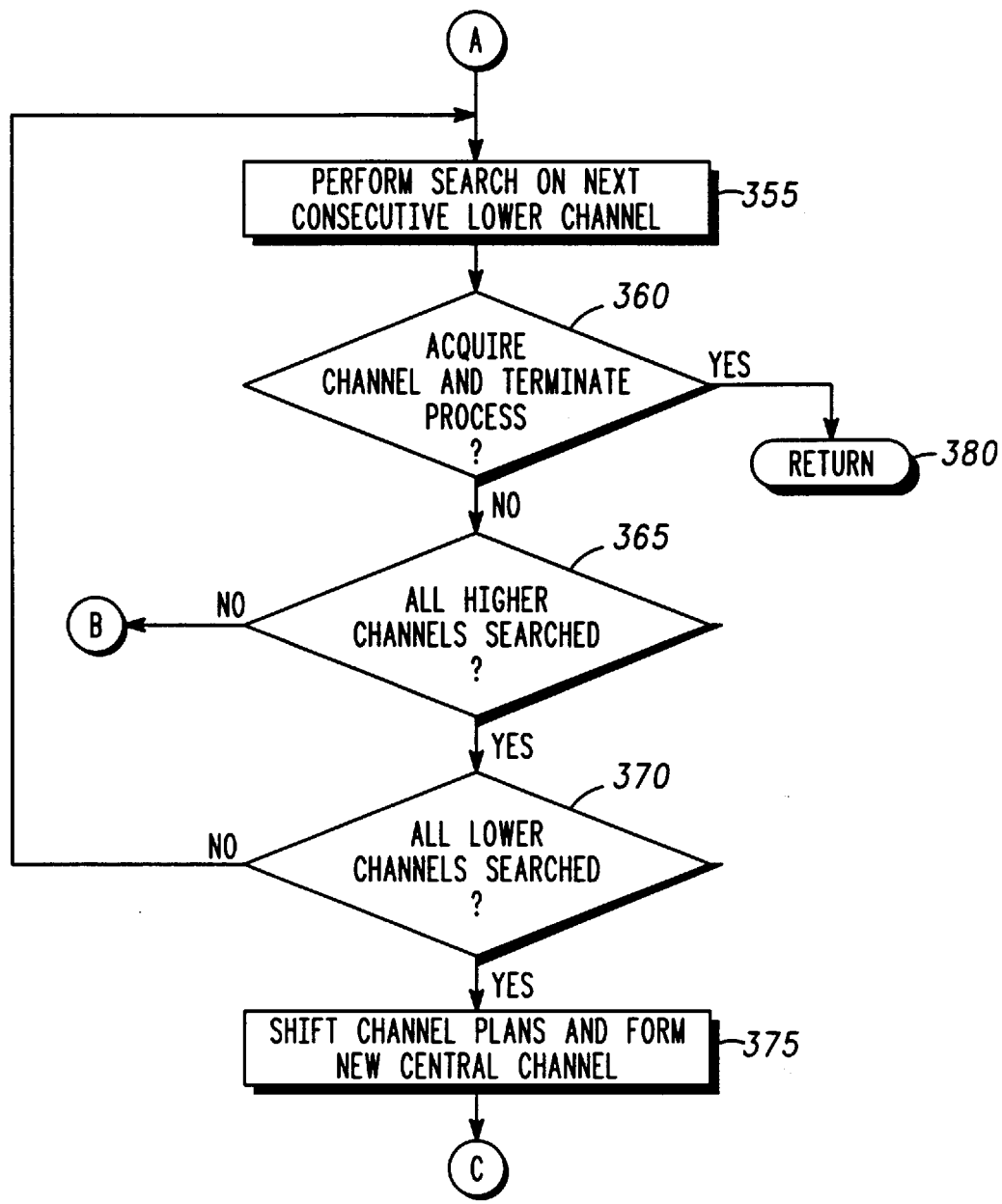

FIG. 5 is a flow chart illustrating the channel selection portion of the method of channel acquisition in accordance with the present invention. As mentioned above, channels having the highest likelihood of being the assigned channel are examined first, to expedite the channel acquisition process. In addition, as explained in greater detail below, depending upon the particular communication system implementation, more than one channel or frequency plan may be utilized in channel selection. For example, in the preferred embodiment, channels may be selected according to a channel plan referred to as IRC (incrementally related carriers), having a spectrum spanning 66 to 750 MHz, with channels having a 6 MHz bandwidth, resulting in channel center frequencies every 6 MHz from 69 MHz to 747 MHz. Another channel or frequency plan, referred to as HRC (harmonically related carriers), utilizes a similar spectrum, with all channel center frequencies offset by −1.25 MHz. A third channel plan, referred to as the standard assignment plan, is similar to IRC, except that some channels in the spectrum are reserved for other purposes or are otherwise unused. Other channel plans may also be utilized, and need only include a plurality of logical or physical channels (such as time or frequency division multiplexed channels). As used herein, of course, a channel plan may be any collection or grouping of logical or physical channels.

Referring to FIG. 5, beginning with start step 300, the channel selection process begins with the selection of a channel which will be examined in the search or detection procedures discussed above. In the preferred embodiment, to increase the likelihood of quickly detecting a channel, the first channels to be searched will be those used previously, based upon the assumption that a given secondary device will most likely be currently assigned to the same set of channels as used previously or to a nearby channel (i.e., in the same spectrum range). Upon initial system start up or initialization, the settings for previous channels (as stored in non-volatile memory, such as in a non-volatile memory portion of memory 155) will be default values or other predetermined values, such that a channel will be selected to begin the search process. As channels are acquired or as a secondary station is reassigned to other channels, a record identifying a plurality of these previously used (or previous) channels will be stored in non-volatile memory, such as a non-volatile memory portion of memory 155. As a consequence, in step 305, the last previous channel (also described as the most recently used channel) of a plurality of previous channels (i.e., the previously used channels or default values on system initialization) is selected to form a selected channel, and the search process discussed above is performed on this selected channel, step 310. If as a result of the search process the selected channel is acquired and the acquisition process is terminated, step 315, the channel selection process may also end, return step 380. If the selected channel was not acquired in the search process, step 315, then another previous channel will be selected, provided that all of the previous channels have not been searched, step 320. If all of the previous channels (of the plurality of previous channels) have not been searched, step 320, then another previous channel, such as the next consecutive previous channel (i.e., the next most recently used channel), is selected from the plurality of previous channels, step 325, and a search is performed on this (new) selected channel, returning to step 310. If all of the previous channels (of the plurality of previous channels) have been searched (through the least recently used channel), step 320, without any having been acquired in step 315, then the process broadens the search process to begin searching throughout the particular channel or frequency plan.

Continuing to refer to FIG. 5, when the search is going to be broadened (because no previous channels were acquired), a central channel is selected in step 330, based upon either the last previous channel or the particular channel plan. In the preferred embodiment, the central channel is set to 597 MHz for IRC and 595.75 MHz for HRC. In alternative embodiments, the central channel may be selected as any starting point for the search process, and may be based upon any particular channel plan employed by a service provider. In another embodiment, the last previous channel may also be selected as the central channel, in order to focus the search process in the vicinity of the last previous channel (under the assumption that the currently assigned channel will be nearby or in the same spectral range as the last previous channel). In the preferred embodiment, the central channel is searched in step 335. In the alternative embodiment, if the central channel has not been previously searched (em, the central channel selected is not a previous channel), it is searched in step 335. If the central channel has been acquired in the search, the acquisition process terminates, step 340 and return step 380. If the central channel has not been acquired in the search, then channels in the vicinity of the central channel, alternating between the higher and lower channels, will be searched consecutively, beginning in the preferred embodiment with the next consecutively higher channel in step 345. If the next consecutive higher channel has been acquired in the search, the acquisition process terminates, step 350 and return step 380. If the next consecutive higher channel has not been acquired in the search, step 350, a search is performed on the next consecutive channel lower in the spectrum than the central channel, step 355. In this way, the channel selection and channel search pattern will proceed outwardly, i.e., both higher and lower, from the central channel. If the next consecutive lower channel has been acquired in the search, the acquisition process terminates, step 360 and return step 380. If the next consecutive higher channel has not been acquired in the search, step 360, the search process will continue to search the consecutively higher and consecutively lower channels, until all higher and lower channels have been searched. In step 365, if all higher channels have not been searched, then following step 360, the process returns to step 345 to search the next consecutively higher channel, and proceeds through steps 350–360 (depending upon channel acquisition terminating the process). If all higher channels have been searched, step 365, the process determines whether all lower channels have also been searched, step 370. If all lower channels have not been searched, then the process returns to step 355, and a search is performed on the next consecutive channel lower in the spectrum than the central channel, step 355. It will be apparent to those skilled in the art that higher and lower channels may be searched in any order, such as lower channels first, and the determinations made in steps 365 and 370 may also be performed in other orders. In the preferred embodiment, it is anticipated that the frequently used channels will be biased toward the higher end of the spectrum and, as a consequence, all higher channels will be searched before all lower channels will be searched, resulting in the ordering of steps 365 and 370 as illustrated in FIG. 5. If all higher and lower channels have been searched, steps 365 and 370, the search process will repeat utilizing an alternate channel plan, if any, forming or selecting a new central channel in step 375, and returning to step 335. If an alternate channel plan is not available, then the process may be similarly repeated utilizing the same channel plan. Also, when the channel search has not been terminated previously through acquisition of a channel, the method may continue the channel search under a first channel plan, such as IRC, alternatingly with an alternate channel plan, such as HRC.

In the preferred embodiment, this broader channel selection, utilizing one or more channel or frequency plans, is implemented by assigning a sequential channel number to each consecutive channel (based upon its center frequency, with each channel spaced 6 MHz apart, as discussed above). The searching of higher and lower channels is implemented utilizing an even and odd toggling system, with the lower channels assigned an even iteration counter and the higher channels assigned an odd iteration counter, such that testing the counter for an even or odd value branches the method into lower and higher channel search paths. The searching of higher and lower channels may also be implemented utilizing two counters, such as iteration or loop counters, counting down for the lower channels and counting up for the higher channels. For example, in the preferred embodiment, channel number 91 is assigned to an IRC downstream channel of 597 MHz, and an HRC downstream channel of 595.75 MHz, with an iteration counter set equal to zero. When these channels are used as central channels in step 330, the next higher channel, channel 92, corresponds to an IRC downstream channel of 603 MHz, and an HRC downstream channel of 601.75 MHz, with an odd iteration count of one, while the next lower channel, channel 90, corresponds to an IRC downstream channel of 591 MHz, and an HRC downstream channel of 589.75 MHz, with an even iteration count of two. On the next search iteration of steps 345 through 370, the next higher channel, channel 93, corresponds to an IRC downstream channel of 609 MHz, and an HRC downstream channel of 607.75 MHz, with an odd iteration count of three, while the next lower channel, channel 89, corresponds to an IRC downstream channel of 585 MHz, and an HRC downstream channel of 583.75 MHz, with an even iteration count of four.

Other variations of the channel selection methodology illustrated in FIG. 5 may also be utilized. For example, if a predetermined or adaptive number of high channels (i.e., channels having a higher frequency than the center channel) consecutively have no energy or selected modulation mode (such as 64 QAM), then searching of additional high channels may be deferred until all lower channels have been searched. Other variations may include searching multiple channels at once, for example, searching adjacent channels, utilizing more bandwidth (wider bandpass) in receiver tuning.

In summary, FIG. 5 illustrates a method for channel acquisition comprising:

(a) commencing a channel acquisition process by selecting a first previous channel from a plurality of previous channels to form a selected channel (step 305);

(b) performing a search process on the selected channel (step 310);

(c) when the search process has acquired the selected channel to form an acquired channel, terminating the channel acquisition process (steps 315 and 380);

(d) when the search process has not acquired the selected channel to form an acquired channel, continuing the channel acquisition process by selecting a next channel from the plurality of previous channels to form the selected channel and returning to step (b) until all previous channels of the plurality of previous channels have undergone the search process (steps 315, 320 and 325);

(e) when all previous channels of the plurality of previous channels have undergone the search process, determining a central channel based upon the first previous channel (steps 320 and 330);

(f) continuing the channel acquisition process by selecting a next higher channel, from a plurality of channels higher than the central channel, to form the selected channel, performing the search process on the selected channel, and when the search process has acquired the selected channel to form an acquired channel, terminating the channel acquisition process (steps 345, 350 and 380);

(g) when the channel acquisition process has not been terminated in step (f), continuing the channel acquisition process by selecting a next lower channel, from a plurality of channels lower than the central channel, to form the selected channel, performing the search process on the selected channel, and when the search process has acquired the selected channel to form an acquired channel, terminating the channel acquisition process (steps 350, 355, 360 and 380);

(h) when the channel acquisition process has not been terminated in step (g) and until all higher channels of the plurality of channels higher than the central frequency and all lower channels of the plurality of channels lower than the central frequency have undergone the search process, continuing the channel acquisition process by returning to step (f) (steps 360, 365, 370, returning to steps 345 and/or 355); and (i) when all higher channels of the plurality of channels higher than the central frequency and all lower channels of the plurality of channels lower than the central frequency have undergone the search process, determining a central channel based upon an alternate channel plan and continuing the channel acquisition process by returning to step (e) (steps 365, 370, 375, returning to step 335).

Also in summary, FIGS. 4 and 5 illustrate a method for channel acquisition in a communication system, comprising, first, selecting a first channel of the plurality of channels to form a selected channel (step 205); second, monitoring the selected channel for a predetermined or adaptive energy level (step 210); third, when the selected channel has the predetermined energy level, monitoring the selected channel for a predetermined modulation mode (step 215); fourth, when the selected channel has the predetermined modulation mode, monitoring the selected channel for a protocol signal having a selected identification of a plurality of identifications (step 225); and fifth, when the selected channel has the protocol signal having the selected identification, acquiring the selected channel to obtain an acquired channel (step 250). The fourth step may also have two portions, namely, monitoring the selected channel for a protocol (step 223), and when the selected channel has the protocol, monitoring the selected channel for a protocol signal having a selected identification of a plurality of identifications (step 225). In addition, when the acquired channel has not been obtained in these five steps, the method then selects a second channel of the plurality of channels to form the selected channel and repeats the second through fifth. Lastly, second channels are selected, until the an acquired channel has been obtained, by sequentially: first, selecting the second channel from the plurality of previous channels (step 305, 320 and 325); second, selecting the second channel from a central channel of a first channel plan (step 330); third, selecting the second channel as a next higher channel from a plurality of channels higher than the central channel in the first channel plan (step 345), alternating with selecting the second channel as a next lower channel from a plurality of channels lower than the central channel in the first channel plan (step 355); fourth, selecting the second channel from a central channel of a second channel plan (steps 375 and 330); and fifth, selecting the second channel as a next higher channel from a plurality of channels higher than the central channel in the second channel plan (steps 375 and 345), alternating with selecting the second channel as a next lower channel from a plurality of channels lower than the central channel in the second channel plan (steps 375 and 355).

Also in summary, in light of FIGS. 4 and 5, FIGS. 2 and 3 illustrate an apparatus (101, 110) for channel acquisition in a communication system, with the communication system having a communications medium, and with the communications medium having a plurality of channels. The apparatus (101, 110) then includes, first, a channel interface coupleable to the communications medium for signal reception on a channel of the plurality of channels to form a received signal, such as channel interface 160 or 125$_n$). Second, the apparatus includes a processor arrangement, such as processor 150 or processor arrangement 120, coupled to the channel interface to process the received signal. The processor arrangement is responsive through a set of program instructions to select a channel of the plurality of channels to form a selected channel and to commence a channel search by monitoring the selected channel for a predetermined energy level (processor 150 or processor arrangement 120 and steps 205 and 210); the processor arrangement is further responsive, when the selected channel does not have the predetermined energy level, to terminate the channel search, i.e., the particular iteration of the channel search or detection process (processor 150 or processor arrangement 120 and steps 210 and 240); with the processor arrangement further responsive, when the selected channel has the predetermined energy level, to monitor the selected channel for a predetermined modulation mode (processor 150 or processor arrangement 120 and steps 210 and 215); with the processor arrangement further responsive, when the selected channel does not have the predetermined modulation mode, to terminate the channel search (processor 150 or processor arrangement 120 and steps 215 and 240); the processor arrangement further responsive, when the selected channel has the predetermined modulation mode, to monitor the selected channel for a protocol message having a selected identification of a plurality of identifications (processor 150 or processor arrangement 120 and steps 215 and 225); the processor arrangement further responsive, when the selected channel does not have the protocol message having the selected identification, to terminate the channel search (processor 150 or processor arrangement 120 and steps 225, 230, 235 and 240); and with the processor arrangement further responsive, when the selected channel has the protocol message having the selected identification, to acquire the selected channel to form an acquired channel and to terminate the channel search process (processor 150 or processor arrangement 120 and steps 225, 250 and 255).

Continuing to refer to FIGS. 2 and 3, in light of FIGS. 4 and 5, in summary, the processor arrangement is further responsive, when the channel search process has been terminated without acquisition of the selected channel to form the acquired channel, to select a second channel to form the selected channel and to continue the channel search until a selected channel has been acquired to form the acquired channel (processor 150 or processor arrangement 120 and step 240). Also as illustrated, the processor arrangement is further responsive to select as the first channel a first previous channel from the plurality of previous channels to form the selected channel (processor 150 or processor arrangement 120 and step 305). The processor arrangement is also further responsive, sequentially, when the channel search has not been terminated previously, to select the second channel from the plurality of previous channels until all channels of the plurality of previous channels have undergone the channel search (processor 150 or processor arrangement 120 and steps 310, 315, 320 and 325); when all previous channels of the plurality of previous channels have undergone the channel search process, the processor is further responsive to determine a central channel based upon the first previous channel and, until the processor has terminated the channel search by acquiring a selected channel, to alternatingly select as the second channel a next higher channel, from a plurality of channels higher than the central channel, to form the selected channel and to select as the second channel a next lower channel, from a plurality of channels lower than the central channel, until all channels of the plurality of channels higher than the central channel and all channels of the plurality of channels lower than the central channel have undergone the channel search (processor 150 or processor arrangement 120 and steps 320, and 330 through 370, inclusive); and the processor arrangement further responsive, when all channels of the plurality of channels higher than the central channel and all channels of the plurality of channels lower than the central channel have undergone the channel search, to determining a central channel from an alternate channel plan and continue the channel search (processor 150 or processor arrangement 120 and steps 365, 370 and 375, returning to step 335).

Lastly in summary, in light of FIGS. 4 and 5, FIGS. 2 and 3 illustrate an apparatus (101, 110) for channel acquisition in a communication system, the apparatus comprising: first, a channel interface (125,160) coupleable to the communications medium (114, 115 or 116) for signal reception on a channel of the plurality of channels to form a received signal; and second, a processor arrangement (120 or 150) coupled to the channel interface to process the received signal, the processor arrangement responsive through a set of program instructions to commence a channel search by selecting a first channel of the plurality of channels to form a selected channel and monitoring the selected channel for a predetermined energy level (205 and 210); when the selected channel has the predetermined energy level, the processor arrangement further responsive to continue the channel search by monitoring the selected channel for a predetermined modulation mode (215), and when the selected channel has the predetermined modulation mode, monitoring the selected channel for a protocol signal having a selected identification of a plurality of identifications (225); and when the selected channel has the protocol signal having the selected identification, the processor arrangement further responsive to acquire the selected channel to obtain an acquired channel and terminate the channel search (250, 255). The processor arrangement may be further responsive, until the acquired channel has been obtained, to select a second channel of the plurality of channels to form the selected channel and to continue the channel search (240). The processor arrangement is further responsive, until the acquired channel has been obtained, to sequentially: select the second channel from the plurality of previous channels until all previous channels of the plurality of previous channels have been selected 305, 320 and 325); select as the second channel a central channel of a first channel plan (330); select the second channel as a next higher channel from a plurality of channels higher than the central channel in the first channel plan, alternating with selection of the second channel as a next lower channel from a plurality of channels lower than the central channel in the first channel plan (345, 355); select as the second channel a central channel of a second channel plan (375, 330); and select the second channel as a next higher channel from a plurality of channels higher than the central channel in the second channel plan, alternating with selection of the second channel as a next lower channel from a plurality of channels lower than the central channel in the second channel plan (375, 345, 355). Lastly, the apparatus may also include a non-volatile memory (within memory 155, memory 131, or memory 122) coupled to the processor arrangement, the non-volatile memory storing the plurality of previous channels.

Apparent from the discussion above, the apparatus and method in accordance with the present invention provides for quick and reliable detection of a channel designated for reception of data and other information, without utilizing a predetermined or fixed channel, without user intervention, and without prior knowledge of the currently assigned or designated channel. Upon initial system start up or initialization, an apparatus such as a secondary station may utilize an extensive search to locate and acquire its assigned downstream channel. During operation, however, the particular secondary station may be reassigned (by the primary station, via a protocol message or other signal) to a variety of downstream channels, depending upon factors such as channel noise and channel traffic loads. All of these assigned channels may be stored in non-volatile memory in the preferred embodiment, so that upon any powering up or coming on line subsequent to the initialization, the secondary station will essentially have a listing or library of frequently assigned channels stored in its memory, which may be immediately searched to locate and acquire the currently assigned channel. As a consequence, the apparatus and method of the present invention provides for increased communication system agility and flexibility in channel utilization and assignment, particularly through channel reassignment under conditions of high traffic or high noise conditions, when utilization of additional or other downstream channels may be preferred, through such quick and reliable detection of a currently assigned channel, without user intervention, without prior knowledge of designated channel, and without utilizing a predetermined or fixed channel.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for channel acquisition in a communication system, the communication system having a communications medium, the communications medium having a plurality of channels, the method comprising:

(a) selecting a first channel of the plurality of channels to form a selected channel;

(b) monitoring the selected channel for an energy level;

(c) when the selected channel has the energy level, monitoring the selected channel for a predetermined modulation mode;

(d) when the selected channel has the predetermined modulation mode, monitoring the selected channel for a protocol signal having a selected identification of a plurality of identifications;

(e) when the selected channel has the protocol signal having the selected identification, acquiring the selected channel to obtain an acquired channel; and (f) when the acquired channel has not been obtained, selecting a second channel of the plurality of channels to form the selected channel and repeating steps (b) through (e), inclusive, until the acquired channel has been obtained, wherein the step of selecting the second channel comprises, for each iteration of repeating steps (b) through (e), sequentially:

(f1) selecting the second channel from among a number of previous channels;

(f2) selecting the second channel from a central channel of a first channel plan;

(f3) selecting the second channel as a next higher channel from a plurality of channels higher than the central channel in the first channel plan, alternating with selecting the second channel as a next lower channel from a plurality of channels lower than the central channel in the first channel plan;

(f4) selecting the second channel from a central channel of a second channel plan; and (f5) selecting the second channel as a next higher channel from a plurality of channels higher than the central channel in the second channel plan, alternating with selecting the second channel as a next lower channel from a plurality of channels lower than the central channel in the second channel plan.

2. The method of claim 1, further comprising:

(f6) repeating steps (f2) through (f5), inclusive.

3. The method of claim 1, further comprising:

(f7) storing in a memory an identification of a plurality of acquired channels.

4. The method of claim 1, further comprising:

(f8) storing in a memory an identification of a plurality of assigned channels.

5. The method of claim 1 wherein the plurality of previous channels, upon communication system initialization, consist of default channel values.

6. The method of claim 1 wherein the plurality of previous channels, subsequent to communication system initialization, consist of at least one previously acquired channel.

7. The method of claim 1 wherein the predetermined modulation mode is quadrature amplitude modulation.

8. The method of claim 1 wherein the selected identification is an identifier unique to a secondary station coupleable to the communication system.

9. The method of claim 1 wherein the protocol signal is a broadcast message having a plurality of identifications.

10. The method of claim 1 wherein step (d) further comprises:

(d) determining whether a predetermined period of time has elapsed, and when the predetermined period of time has elapsed and when the selected channel does not have the protocol signal having the selected identification, selecting a second channel of the plurality of channels to form the selected channel and returning to step (b).

11. The method of claim 1, wherein step (d) further comprises monitoring the selected channel with configuration for forward error correction and without configuration for forward error correction.

12. An apparatus for channel acquisition in a communication system, the communication system having a communications medium, the communications medium having a plurality of channels, the apparatus comprising:

a channel interface coupleable to the communications medium for signal reception on a channel of the plurality of channels to form a received signal; and a processor arrangement coupled to the channel interface to process the received signal, the processor arrangement responsive through a set of program instructions to commence a channel search by selecting a first channel of the plurality of channels to form a selected channel and monitoring the selected channel for an energy level; when the selected channel has the energy level, the processor arrangement further responsive to continue the channel search by monitoring the selected channel for a predetermined modulation mode, and when the selected channel has the predetermined modulation mode, monitoring the selected channel for a protocol signal having a selected identification of a plurality of identifications; when the selected channel has the protocol signal having the selected identification, the processor arrangement further responsive to acquire the selected channel to obtain an acquired channel and terminate the channel search; and when the acquired channel has not been obtained, the processor arrangement further responsive to select a second channel of the plurality of channels to form the selected channel and repeat the channel search until the acquired channel has been obtained, wherein the processor arrangement is further responsive, for each iteration of the channel search, to sequentially:

select the second channel from among a number of previous channels;

select the second channel from a central channel of a first channel plan;

select the second channel as a next higher channel from a plurality of channels higher than the central channel in the first channel plan, alternating with selecting the second channel as a next lower channel from a plurality of channels lower than the central channel in the first channel plan;

select the second channel from a central channel of a second channel plan; and select the second channel as a next higher channel from a plurality of channels higher than the central channel in the second channel plan, alternating with selecting the second channel as a next lower channel from a plurality of channels lower than the central channel in the second channel plan.

13. The apparatus of claim 12, further comprising a non-volatile memory coupled to the processor arrangement, the non-volatile memory storing the plurality of previous channels.

14. The apparatus of claim 13 wherein the plurality of previous channels stored in the non-volatile memory are, upon communication system initialization, default channel values.

15. The apparatus of claim 13 wherein the plurality of previous channels stored in the non-volatile memory, subsequent to communication system initialization, consist of at least one previously acquired channel.

16. The apparatus of claim 12 wherein the processor arrangement is further responsive to determine whether a predetermined period of time has elapsed, and when the predetermined period of time has elapsed, to terminate the channel search.

17. The apparatus of claim 12 wherein the processor arrangement is further responsive to detect a predetermined modulation mode consisting of quadrature amplitude modulation.

18. The apparatus of claim 12 wherein the processor arrangement is further responsive to detect the selected identification as an identifier unique to a secondary station coupleable to the communication system.

19. The apparatus of claim 12 wherein the processor arrangement is further responsive to detect the protocol signal as a broadcast message having a plurality of identifications.

20. The apparatus of claim 12 wherein the apparatus is embodied within a primary station.

21. The apparatus of claim 12, wherein the processor arrangement further comprises:

a first integrated multiprotocol processor coupled to the channel interface;

a second integrated multiprotocol processor coupled to the channel interface; and a master controller coupled to the first integrated multiprotocol processor and to the second integrated multiprotocol processor.

22. The apparatus of claim 12 wherein the apparatus is embodied within a secondary station.

23. The apparatus of claim 12 wherein the processor arrangement is an integrated multiprotocol processor coupled to the channel interface.

24. The apparatus of claim 12 wherein the processor arrangement is further responsive to monitor the selected channel for a protocol, and when the selected channel has the protocol, the processor arrangement is further responsive to monitor the selected channel for a protocol signal having a selected identification of a plurality of identifications.

25. The apparatus of claim 12 wherein the processor arrangement is further responsive, to detect the protocol signal, with configuration for forward error configuration and without configuration for forward error correction.

26. A method for channel acquisition in a communication system, the communication system having a communications medium, the communications medium having a plurality of channels, the method comprising:
   (a) selecting a first channel of the plurality of channels to form a selected channel;
   (b) commencing a channel search process by monitoring the selected channel for an energy level;
   (c) when the selected channel does not have the energy level, proceeding to step (i);
   (d) when the selected channel has the energy level, monitoring the selected channel for a predetermined modulation mode;
   (e) when the selected channel does not have the predetermined modulation mode, proceeding to step (i);
   (f) when the selected channel has the predetermined modulation mode, monitoring the selected channel for a protocol signal having a selected identification of a plurality of identifications;
   (g) when the selected channel does not have the protocol signal having the selected identification, proceeding to step (i);
   (h) when the selected channel has the protocol signal having the selected identification, acquiring the selected channel to form an acquired channel and to terminate the channel search process; and
   (i) when the channel search process has not been terminated in step (h), selecting a second channel to form the selected channel and returning to step (b), wherein the step of selecting the second channel comprises, for each iteration of the channel search process:
      (i1) if at least one of the number of previous channels remains to be searched, selecting the second channel from among a number of previous channels;
      (i2) if all previous channels of the plurality of previous channels have undergone the channel search process, selecting the second channel from a central channel of a first channel plan;
      (i3) if the central channel of the first channel plan has undergone the channel search process, selecting the second channel as a next higher channel from a plurality of channels higher than the central channel in the first channel plan, alternating with selecting the second channel as a next lower channel from a plurality of channels lower than the central channel in the first channel plan;
      (i4) if all channels of the first channel plan have undergone the channel search process, selecting the second channel from a central channel of a second channel plan; and
      (i5) if the central channel of the second channel plan has undergone the channel search process, selecting the second channel as a next higher channel from a plurality of channels higher than the central channel in the second channel plan, alternating with selecting the second channel as a next lower channel from a plurality of channels lower than the central channel in the second channel plan.

27. The method of claim 26 wherein the plurality of previous channels, upon communication system initialization, consist of default channel values.

28. The method of claim 26 wherein the plurality of previous channels, subsequent to communication system initialization, consist of at least one previously acquired channel.

29. The method of claim 26 wherein step (f) further comprises:
   determining whether a predetermined period of time has elapsed, and when the predetermined period of time has elapsed, proceeding to step (i).

30. The method of claim 26 wherein the predetermined modulation mode is quadrature amplitude modulation.

31. The method of claim 26 wherein the selected identification is an identifier unique to a secondary station coupleable to the communication system.

32. The method of claim 26 wherein the protocol signal is a broadcast message having a plurality of identifications.

33. The method of claim 26, wherein step (f) further comprises monitoring the selected channel with configuration for forward error correction and without configuration for forward error correction.

34. A method for channel acquisition in a communication system, the communication system having a communications medium, the communications medium having a plurality of channels, the method comprising:
   (a) commencing a channel acquisition process by selecting a first previous channel from a plurality of previous channels to form a selected channel;
   (b) performing a search process on the selected channel;
   (c) when the search process has acquired the selected channel to form an acquired channel, terminating the channel acquisition process;
   (d) when the search process has not acquired the selected channel to form an acquired channel, continuing the channel acquisition process by selecting a next channel from the plurality of previous channels to form the selected channel and returning to step (b) until all previous channels of the plurality of previous channels have undergone the search process;
   (e) when all previous channels of the plurality of previous channels have undergone the search process, determining a central channel based upon a first channel plan;
   (f) continuing the channel acquisition process by selecting a next higher channel, from a plurality of channels higher than the central channel, to form the selected channel, performing the search process on the selected channel, and when the search process has acquired the selected channel to form an acquired channel, terminating the channel acquisition process;
   (g) when the channel acquisition process has not been terminated in step (f), continuing the channel acquisition process by selecting a next lower channel, from a plurality of channels lower than the central channel, to form the selected channel, performing the search process on the selected channel, and when the search process has acquired the selected channel to form an acquired channel, terminating the channel acquisition process;
   (h) when the channel acquisition process has not been terminated in step (g) and until all higher channels of the plurality of channels higher than the central frequency and all lower channels of the plurality of channels lower than the central frequency have undergone the search process, continuing the channel acquisition process by returning to step (f);

(i) when all higher channels of the plurality of channels higher than the central frequency and all lower channels of the plurality of channels lower than the central frequency have undergone the search process, determining a central channel based upon a second channel plan and continuing the channel acquisition process by returning to step (e).

35. The method of claim 34, wherein the search process comprises:

(a1) commencing an iteration of the search process by monitoring the selected channel for an energy level;

(b1) when the selected channel does not have the energy level, terminating the iteration of the search process;

(c1) when the selected channel has the energy level, monitoring the selected channel for a predetermined modulation mode;

(d1) when the selected channel does not have the predetermined modulation mode, terminating the iteration of the search process;

(e1) when the selected channel has the predetermined modulation mode, monitoring the selected channel for a protocol signal having a selected identification of a plurality of identifications;

(f1) when the selected channel does not have the protocol signal having the selected identification, terminating the iteration of the search process; and (g1) when the selected channel has the protocol signal having the selected identification, acquiring the selected channel to form an acquired channel.

36. The method of claim 35 wherein step (f1) further comprises:

determining whether a predetermined period of time has elapsed, and when the predetermined period of time has elapsed, terminating the iteration of the search process.

37. The method of claim 35, wherein step (e1) further comprises monitoring the selected channel with configuration for forward error correction and without configuration for forward error correction.

38. The method of claim 34, further comprising:

(j) repeating steps (a) through (i), until the search process has acquired the selected channel to form an acquired channel.

39. An apparatus for channel acquisition in a communication system, the communication system having a communications medium, the communications medium having a plurality of channels, the apparatus comprising:

a channel interface coupleable to the communications medium for signal reception on a channel of the plurality of channels to form a received signal; and a processor arrangement coupled to the channel interface to process the received signal, the processor arrangement responsive through a set of program instructions to select a first channel of a plurality of previous channels to form a selected channel and to commence a channel search by monitoring the selected channel for an energy level; the processor arrangement further responsive, when the selected channel does not have the energy level, to terminate the channel search; the processor arrangement further responsive, when the selected channel has the energy level, to monitor the selected channel for a predetermined modulation mode; the processor arrangement further responsive, when the selected channel does not have the predetermined modulation mode, to terminate the channel search; the processor arrangement further responsive, when the selected channel has the predetermined modulation mode, to monitor the selected channel for a protocol signal having a selected identification of a plurality of identifications; the processor arrangement further responsive, when the selected channel does not have the protocol signal having the selected identification, to terminate the channel search; the processor arrangement further responsive, when the selected channel has the protocol signal having the selected identification, to acquire the selected channel to form an acquired channel and to terminate the channel search process; the processor arrangement further responsive, when the channel search process has been terminated without acquisition of the selected channel to form the acquired channel, to select a second channel to form the selected channel and to commence another channel search until a selected channel has been acquired to form the acquired channel, wherein the processor arrangement is further responsive, for each iteration of the channel search, to select the second channel from among the plurality of previous channels until all channels of the plurality of previous channels have undergone the channel search; when all previous channels of the plurality of previous channels have undergone the channel search process, the processor further responsive to determine a central channel based upon a first channel plan and, until the processor has terminated the channel search by acquiring a selected channel, to alternatingly select as the second channel a next higher channel, from a plurality of channels higher than the central channel, to form the selected channel and to select as the second channel a next lower channel, from a plurality of channels lower than the central channel, until all channels of the plurality of channels higher than the central channel and all channels of the plurality of channels lower than the central channel have undergone the channel search; and the processor arrangement further responsive, when all channels of the plurality of channels higher than the central channel and all channels of the plurality of channels lower than the central channel have undergone the channel search, to determine a central channel from a second channel plan.

40. The apparatus of claim 39, wherein the processor arrangement is further responsive, sequentially, when the channel search has not been terminated previously, to continue the channel search under the first channel plan alternatingly with the second channel plan.

41. The apparatus of claim 39, further comprising a memory coupled to the processor arrangement, the memory storing the plurality of previous channels.

42. The apparatus of claim 41 wherein the plurality of previous channels stored in the memory are, upon communication system initialization, default channel values.

43. The apparatus of claim 41 wherein the plurality of previous channels stored in the memory, subsequent to communication system initialization, consist of at least one previously acquired channel.

44. The apparatus of claim 39 wherein the processor arrangement is further responsive to determine whether a predetermined period of time has elapsed, and when the predetermined period of time has elapsed, to terminate the channel search.

45. The apparatus of claim 39, wherein the processor arrangement further comprises:
   a first integrated multiprotocol processor coupled to the channel interface;
   a second integrated multiprotocol processor coupled to the channel interface; and
   a master controller coupled to the first integrated multiprotocol processor and to the second integrated multiprotocol processor.

46. The apparatus of claim 35, wherein the processor arrangement is an integrated multiprotocol processor coupled to the channel interface.

47. The apparatus of claim 35 wherein the processor arrangement is further responsive, to detect the protocol signal, with configuration for forward error configuration and without configuration for forward error correction.

48. An apparatus for channel acquisition in a communication system, the communication system having a communications medium, the communications medium having a plurality of channels, the plurality of channel having a plurality of previous channels, the apparatus comprising:
   a channel interface coupleable to the communications medium for signal reception on a channel of the plurality of channels to form a received signal;
   an integrated multiprotocol processor coupled to the channel interface to process the received signal, the integrated multiprotocol processor further having a memory to store the plurality of previous channels, the integrated multiprotocol processor responsive through a set of program instructions to select a first previous channel of the plurality of previous channels to form a selected channel and to commence a channel search by monitoring the selected channel for an energy level; the integrated multiprotocol processor further responsive, when the selected channel does not have the energy level, to terminate the channel search; the integrated multiprotocol processor further responsive, when the selected channel has the energy level, to monitor the selected channel for a predetermined modulation mode; the integrated multiprotocol processor further responsive, when the selected channel does not have the predetermined modulation mode, to terminate the channel search; the integrated multiprotocol processor further responsive, when the selected channel has the predetermined modulation mode, to monitor the selected channel for a protocol; the integrated multiprotocol processor further responsive, when the selected channel does not have the protocol, to terminate the channel search, and when the selected channel does have the protocol, to monitor the selected channel for a protocol signal having a selected identification of a plurality of identifications; the integrated multiprotocol processor further responsive, when the selected channel does not have the protocol signal having the selected identification, to terminate the channel search; and the integrated multiprotocol processor further responsive, when the selected channel has the protocol signal having the selected identification, to acquire the selected channel to form an acquired channel and to terminate the channel search process; the integrated multiprotocol processor further responsive, when the channel search process has been terminated without acquisition of the selected channel to form the acquired channel, to select a second channel to form the selected channel and to continue the channel search until a selected channel has been acquired to form the acquired channel; the integrated multiprotocol processor further responsive, sequentially, when the channel search has not been terminated previously, to select the second channel from the plurality of previous channels until all channels of the plurality of previous channels have undergone the channel search; when all previous channels of the plurality of previous channels have undergone the channel search process, the processor further responsive to determine a central channel based upon a first channel plan and, until the processor has terminated the channel search by acquiring a selected channel, to alternatingly select as the second channel a next higher channel, from a plurality of channels higher than the central channel, to form the selected channel and to select as the second channel a next lower channel, from a plurality of channels lower than the central channel, until all channels of the plurality of channels higher than the central channel and all channels of the plurality of channels lower than the central channel have undergone the channel search; and the integrated multiprotocol processor further responsive, when all channels of the plurality of channels higher than the central channel and all channels of the plurality of channels lower than the central channel have undergone the channel search, to determining a central channel from a second channel plan and continue the channel search; and the integrated multiprotocol processor further responsive, sequentially, when the channel search has not been terminated previously, to continue the channel search under the first channel plan alternatingly with the second channel plan.

* * * * *